United States Patent
Asada et al.

(10) Patent No.: US 9,459,827 B2
(45) Date of Patent: Oct. 4, 2016

(54) INFORMATION PROCESSING APPARATUS, METHOD FOR PROCESSING INFORMATION, AND PROGRAM

(71) Applicant: Sony Corporation, Tokyo (JP)

(72) Inventors: Kohei Asada, Kanagawa (JP); Yasunobu Murata, Tokyo (JP)

(73) Assignee: SONY CORPORATION, Tokyo (JP)

(\*) Notice: Subject to any disclaimer, the term of this patent is extended or adjusted under 35 U.S.C. 154(b) by 37 days.

(21) Appl. No.: 14/205,427

(22) Filed: Mar. 12, 2014

(65) Prior Publication Data
US 2014/0292798 A1 Oct. 2, 2014

(30) Foreign Application Priority Data
Mar. 26, 2013 (JP) ................................. 2013-063835

(51) Int. Cl.
G09G 5/02 (2006.01)
G06F 3/16 (2006.01)

(52) U.S. Cl.
CPC .................................... *G06F 3/165* (2013.01)

(58) Field of Classification Search
CPC .......... G06F 3/011; G06T 11/60; G06T 5/40; G06T 15/503; H04N 7/50; H03G 9/02
USPC ........ 345/592, 594, 598, 619; 382/168, 232, 382/235, 251; 381/56, 86, 97, 98, 102, 103, 381/104
See application file for complete search history.

(56) References Cited

U.S. PATENT DOCUMENTS

| | | | | |
|---|---|---|---|---|
| 2001/0020950 A1* | 9/2001 | Shimizu | .................. | G06T 3/403 345/611 |
| 2004/0240686 A1* | 12/2004 | Gibson | .......................... | 381/119 |
| 2006/0088229 A1* | 4/2006 | Taguchi | .............. | G11B 27/031 382/309 |
| 2006/0164437 A1* | 7/2006 | Kuno | ...................... | G09G 5/14 345/629 |
| 2008/0074486 A1* | 3/2008 | Robinson | ...................... | 347/264 |
| 2009/0015594 A1* | 1/2009 | Baba | ............................. | 345/619 |
| 2010/0007679 A1* | 1/2010 | Sakaigawa | ........... | G09G 3/3406 345/690 |
| 2011/0191674 A1* | 8/2011 | Rawley | .................. | G06F 3/016 715/702 |

FOREIGN PATENT DOCUMENTS

JP 2000-235772 A 8/2000

OTHER PUBLICATIONS

Cox, I. J., Kilian, J., Leighton, F. T., & Shamoon, T. (1997), "Secure Spread Spectrum Watermarking for Multimedia", Image Processing, IEEE Transactions on, 6(12), pp. 1673-1687.*

\* cited by examiner

*Primary Examiner* — Xiao Wu
*Assistant Examiner* — Sarah Lhymn
(74) *Attorney, Agent, or Firm* — Chip Law Group

(57) ABSTRACT

An information processing apparatus includes a parameter input unit configured to input parameter information for setting an operating state of a target apparatus, an image conversion unit configured to generate conversion image data by imaging the parameter information, and a setting file image generation unit configured to generate setting file image data where the conversion image data is placed in image data having a larger image size than the conversion image data.

16 Claims, 12 Drawing Sheets

| x | y | Hz | dB |
|---|---|---|---|
| 0 | 288.25 | 20 | −4.02083 |
| 5 | 267 | 20.82545 | −2.25 |
| 10 | 248.25 | 21.68497 | −0.6875 |
| 15 | 232 | 22.57996 | 0.666667 |
| 20 | 218.25 | 23.51189 | 1.8125 |
| 25 | 204.6727 | 24.48229 | 2.943938 |
| 30 | 195.942 | 25.49273 | 3.6715 |
| 35 | 189.25 | 26.54488 | 4.229167 |
| 40 | 182.278 | 27.64046 | 4.810164 |
| 45 | 176.9702 | 28.78125 | 5.252483 |
| 50 | 171.308 | 29.96912 | 5.724333 |
| 55 | 165.7872 | 31.20602 | 6.184398 |
| 60 | 160.7711 | 32.49397 | 6.602407 |
| 65 | 154.25 | 33.83508 | 7.145833 |
| 70 | 148 | 35.23154 | 7.666667 |
| 75 | 144.25 | 36.68563 | 7.979167 |
| 80 | 143 | 38.19974 | 8.083333 |
| 85 | 141 | 39.77634 | 8.25 |
| 90 | 137.9565 | 41.41801 | 8.503625 |
| 95 | 133.842 | 43.12744 | 8.8465 |
| 100 | 127.25 | 44.90741 | 9.395833 |
| 105 | 120.098 | 46.76086 | 9.991833 |
| 110 | 114.8285 | 48.69079 | 10.43096 |
| 115 | 110 | 50.70039 | 10.83333 |
| 120 | 106.25 | 52.79292 | 11.14583 |
| 125 | 105 | 54.97181 | 11.25 |
| 130 | 103 | 57.24064 | 11.41667 |
| ⋮ | ⋮ | ⋮ | ⋮ |

FIG. 7A

| [α, R, G, B] |
|---|
| C080AAAA |
| C0100000 |
| 3F28AAA2 |
| 403C6880 |
| 40875454 |
| 4097EBDB |
| 40A71454 |
| 40E3ABAB |
| 40FF5454 |
| 41005656 |
| 41040000 |
| 410C8943 |
| 41185656 |
| 4127E437 |
| 412B5656 |
| 41335656 |
| ⋮ |

INFORMATION PROCESSING APPARATUS, METHOD FOR PROCESSING INFORMATION, AND PROGRAM

CROSS REFERENCE TO RELATED APPLICATIONS

This application claims the benefit of Japanese Priority Patent Application JP 2013-063835 filed Mar. 26, 2013, the entire contents of which are incorporated herein by reference.

BACKGROUND

The present technology relates to an information processing apparatus, method for processing information, and computer program that image various parameters of an electronic apparatus or the like and handle an imaged file.

Audio, video, network, and entertainment apparatuses and other electronic apparatuses have been sold in recent years. Each user sets various parameters with respect to particular functions in such an apparatus and then uses the apparatus. Since these parameters are usually set by default, the user has no problem in using the apparatus even when the user does not set the parameters.

On the other hand, if the user can optionally set these parameters and then use them, he or she can increase the enjoyment of using the apparatus or use the apparatus in accordance with his or her preferences or tastes.

For example, there are audio apparatuses and the like in which the user can set frequency characteristics of the equalizer as parameter settings. There are also audio apparatuses which can automatically set the equalizer in accordance with the category of music (see Japanese Unexamined Patent Application Publication No. 2000-235772). Since such an audio apparatus automatically adjusts frequency characteristics in accordance with the category, such as jazz, classic, or pop, the user can listen to and enjoy the music using the adjusted characteristics.

The user may set the parameters of the equalizer at his or her discretion to create unique sound. In this case, the user can enjoy the music in accordance with his or her preferences or the like by setting the equalizer regardless of the category or the like and thus creating sound.

SUMMARY

While the user alone may enjoy the music using the equalizer settings made by him or her, other users may share such equalizer settings and enjoy the music using the equalizer settings.

Further, if users can share example equalizer settings recommended by famous musicians, artists, creators, and the like, they can increase the enjoyment. Furthermore, if users having the same music preferences can share equalizer settings, they are expected to exchange information and develop interactions with one another.

Accordingly, it is desirable to easily and widely provide parameters such as frequency characteristics of the equalizer, for example, set by the user, and to make such parameters easily available.

Firstly, an information processing apparatus according to the present technology includes a parameter input unit configured to input parameter information for setting an operating state of a target apparatus, an image conversion unit configured to generate conversion image data by imaging the parameter information, and a setting file image generation unit configured to generate setting file image data where the conversion image data is placed in image data having a larger image size than the conversion image data.

By generating the setting file image data by imaging the parameter information, the parameter information can be widely distributed.

Secondly, in the information processing apparatus according to the present technology, the setting file image data preferably further includes recognition image data obtained by imaging recognition information for recognizing that the setting file image data is an image including the conversion image data.

Thus, an application or the like for downloading setting file image data can recognize that the image data is setting file image data.

Thirdly, in the information processing apparatus according to the present technology, the image conversion unit preferably generates the conversion image data by converting the parameter information into one of color information and transparency information.

Fourthly, the image conversion unit preferably generates the conversion image data by converting a value included in the parameter information into one of color information and transparency information.

Fifthly, the image conversion unit preferably generates the conversion image data by converting a value included in the parameter information into one of color information and transparency information in accordance with a conversion pattern.

Sixthly, the image conversion unit preferably uses the selected or inputted conversion pattern.

Thus, it is possible to increase the viewability of the image of the setting file image data or to show details of the parameters to the user who has visually recognized the image.

Seventhly, the setting file image data preferably includes image data corresponding to the conversion image data.

Eighthly, the setting file image data preferably includes an image indicating that the setting file image data is an image including the conversion image data.

Ninthly, the setting file image data preferably includes an image indicating a creator of the parameter information.

Tenthly, the setting file image data preferably includes an image indicating the target apparatus.

Thus, the viewability of the setting file image data can be increased. Further, the user who has looked at the setting file image data can easily grasp details thereof.

Eleventhly, the parameter information is preferably a parameter of an equalizer characteristic.

Thus, audio apparatuses, headphone apparatuses, and the like can share the parameters.

A method for processing information according to the present technology includes inputting parameter information for setting an operating state of a target apparatus, generating conversion image data by imaging the parameter information, and generating setting file image data where the conversion image data is placed in image data having a larger image size than the conversion image data.

A program according to the present technology causes an information processing apparatus to perform such a method for processing information.

As seen above, the present technology is suitable for achieving such as an information processing apparatus which generates setting file image data by imaging parameter information.

An information processing apparatus according to the present technology, that is, an information processing apparatus which uses setting file image data includes a setting file image acquisition unit configured to receive setting file image data where conversion image data obtained by imaging parameter information for setting an operating state of a target apparatus is placed in image data having a larger image size than the conversion image data, a conversion image extraction unit configured to extract the conversion image data from the setting file image data, and a parameter decoding unit configured to generate parameter information from the conversion image data.

A method for processing information according to the present technology includes receiving setting file image data where conversion image data obtained by imaging parameter information for setting an operating state of a target apparatus is placed in image data having a larger image size than the conversion image data, extracting the conversion image data from the setting file image data, and generating parameter information from the conversion image data.

A program according to the present technology causes an information processing apparatus to perform such a method for processing information.

According to the present technology, it is possible to receive visualized setting file image data, to convert the setting file image data into parameter information of the target apparatus, and to use the parameter information.

According to the present technology, parameter information is handled as setting file image data. Thus, as with photographs or illustrations, the parameter information can be easily distributed over the network so that it can be easily shared by many users.

BRIEF DESCRIPTION OF THE DRAWINGS

FIG. 3 is a conceptual diagram showing an example where setting information is shared through a dedicated server or the like;

FIGS. 7A to 7G are diagrams showing a first example of generation of setting file image data according to the embodiment;

DETAILED DESCRIPTION OF EMBODIMENTS

Now, details of the present technology will be described in the following order.
1. Parameter Sharing Method
2. Configuration of Information Processing Apparatus
3. First Example of Generation of Setting File Image Data
4. Second Example of Generation of Setting File Image Data
5. Initial Communication with Target Apparatus
6. Setting File Image Data Generation Process
7. Process Using Setting File Image Data
8. Program and Modification
1. Parameter Sharing Method Hereafter, referring to FIGS. 1 to 4, a method which allows many users to share parameters for setting particular functions of various types of electronic apparatuses will be described using the equalizer settings of an audio apparatus (active headphone) as an example. In this case, the parameters of the equalizer are gains (dB) corresponding to predetermined frequencies.

First, assume that a user changes the equalizer settings.

Figure 1:
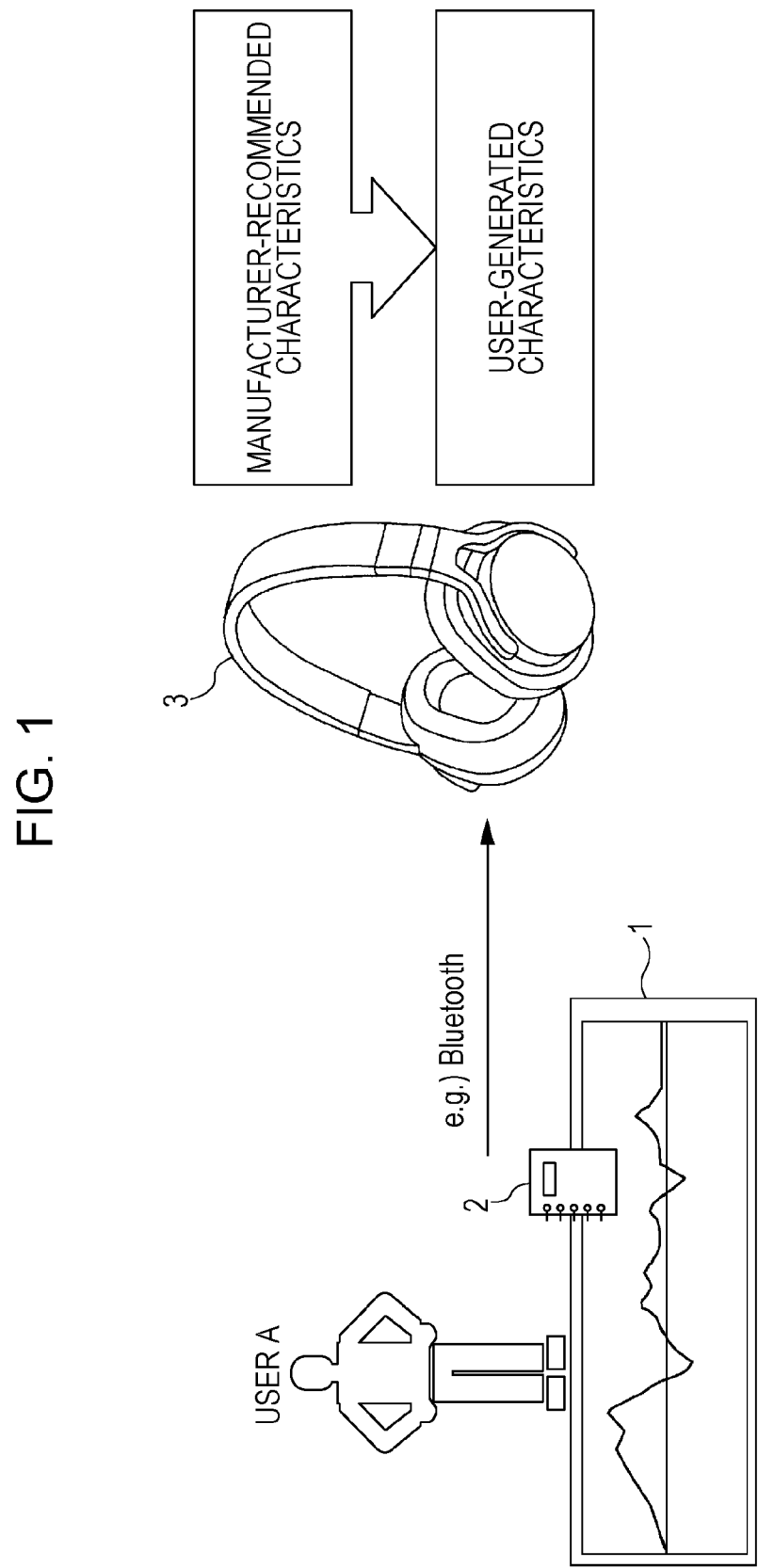
FIG. 1 is a conceptual diagram showing an example where a user makes settings in the equalizer of the target apparatus.

FIG. 1 schematically shows an operation where a user changes the equalizer settings of an active headphone 3 (hereafter simply referred to as the headphone 3). As shown in FIG. 1, a user A edits the equalizer settings of the headphone 3 using an equalizer characteristics editing apparatus 1 (PC terminal or smartphone terminal). This edit is performed by equalizer characteristics editing software (not shown) which runs on the equalizer characteristics editing apparatus 1. The edited equalizer settings are stored in the equalizer characteristics editing apparatus 1 in the form of a setting file 2.

In this edit, the user may create characteristics by making a change to the manufacturer-recommended characteristics or may newly generate characteristics from the beginning.

The user can send the stored setting file 2 to the headphone 3, for example, through Bluetooth® (wireless standard), Universal Serial Bus (USB), or other transmission standards.

The headphone 3 receives the equalizer settings and changes the existing equalizer settings on the basis of the received settings. Thus, the headphone 3 plays back sound using the changed equalizer settings.

As a result of the above operation, the user A can listen to and enjoy music using the headphone 3 in which the user-created characteristics are set. In this case, the equalizer settings are personally owned by the user.

On the other hand, if other users having the same headphones can share the setting file 2, the other users can listen to and enjoy music or the like using the characteristics created by the original user. That is, the users can make the same experience (assume that no consideration is given the difference in auditory sense between the users). In particular, if the user who has originally set the characteristics is a famous artist or the like, the characteristics set by him or her can have a special meaning for the other users, and listening to music using the headphone 3 in which such characteristics are set can be a great pleasure for them.

Further, if the other users can share and use the setting file 2 created by the original user, they can save the time and effort for creating a setting file 2 by themselves.

Figure 2:
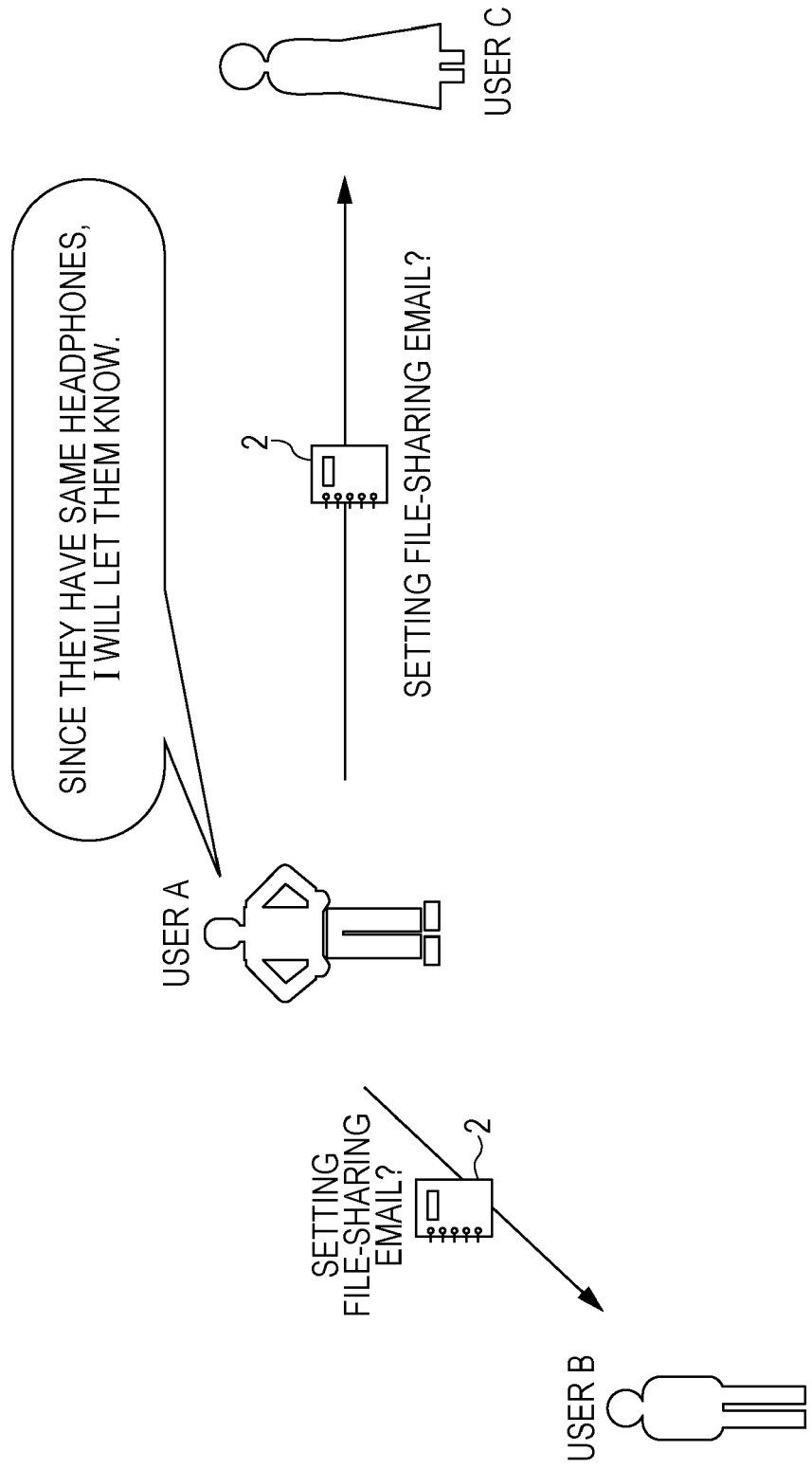
FIG. 2 is a conceptual diagram showing an example where users share setting information.

FIG. 2 shows one example of a sharing method by which users share a setting file 2. As shown in FIG. 2, the sharing method may be attachment of the setting file 2 to emails by a user. For example, a user A sends the setting file 2 to users B and C using emails. Alternatively, the user B may send the setting file 2 received from the user A to the user C using an email. Thus, the three users, A, B, and C, can share the setting file 2. However, typically, the range in which the setting file 2 can be shared is limited to friends or acquaintances of the users.

Figure 3:
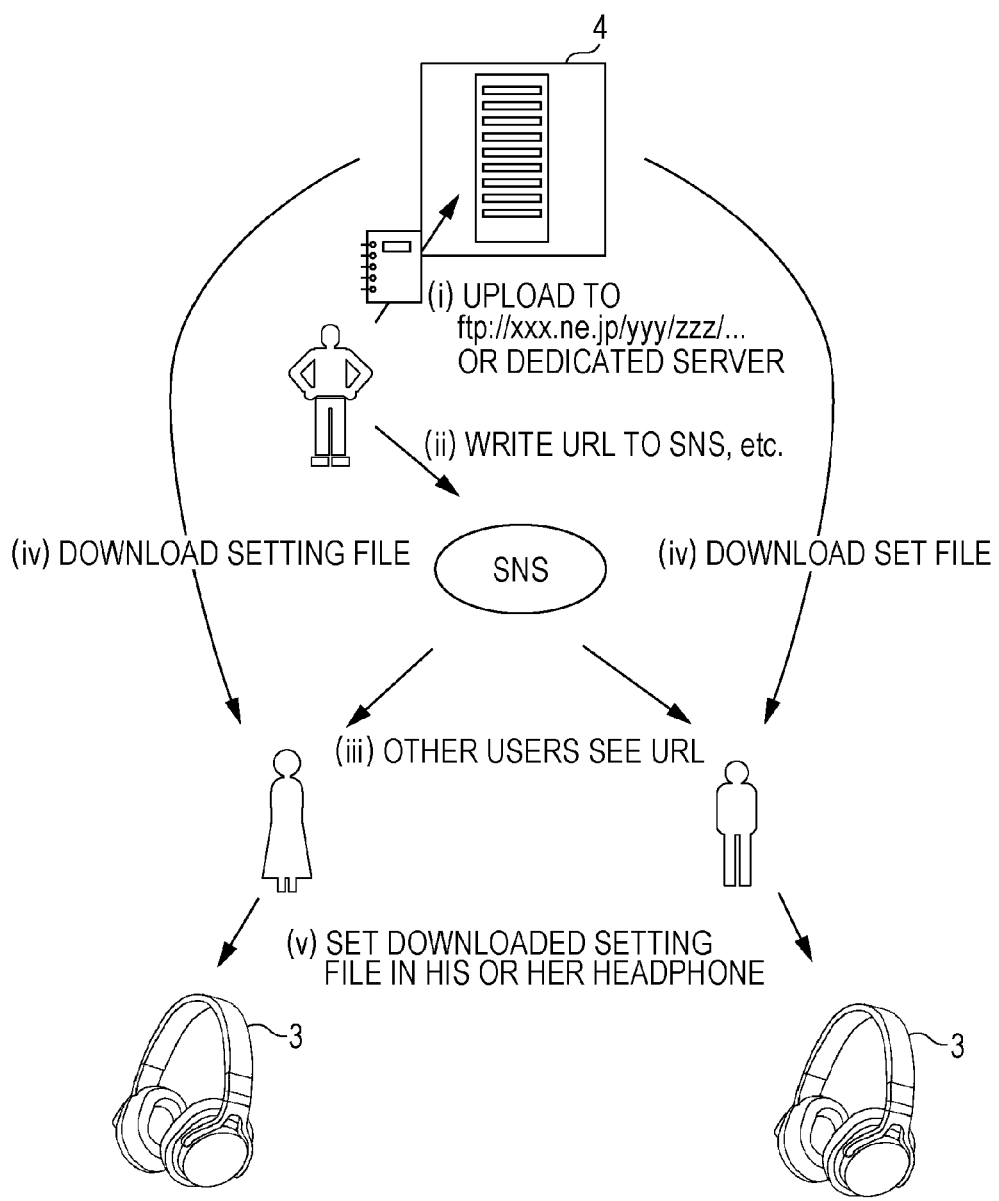

If a user uploads a file to an FTP server or HTTP server owned or contracted with by the user and then makes its uniform resource locator (URL) public on any social networking service (SNS), the sharing range can be increased. FIG. 3 is a conceptual diagram showing this operation.

The flow of the operation is roughly as follows. As shown in FIG. 3, (i) a user uploads a setting file 2 to a server 4 (ftp://xxx.ne.jp/yyy/zzz/ or dedicated server) contracted with by the user; (ii) the user writes the URL of the uploaded setting file 2 to the bulletin board of any SNS; (iii) other users look at the URL; (iv) the other users download the setting file 2 from the URL; and (v) the other users set the downloaded setting file 2 in their headphones 3.

Thus, the other users can listen to and enjoy music using the equalizer settings represented by the setting file 2, that is, using the characteristics set by the original user. That is, the users can make the same experience. In this case, anyone can use the setting file 2 unless there is any access limitation to the URL. The sharing range can become much wider than that in FIG. 2. For example, the original user can share the setting file 2 with an indefinite number of users quickly and flexibly.

In this case, however, a special server has to be set up and run, and those who set up and run such a server have to take significant time and effort. Further, the user may have to bear some cost.

In the present embodiment, there is proposed a sharing method which is simpler than the above sharing method, can be shared by more users, and is convenient.

Figure 4:
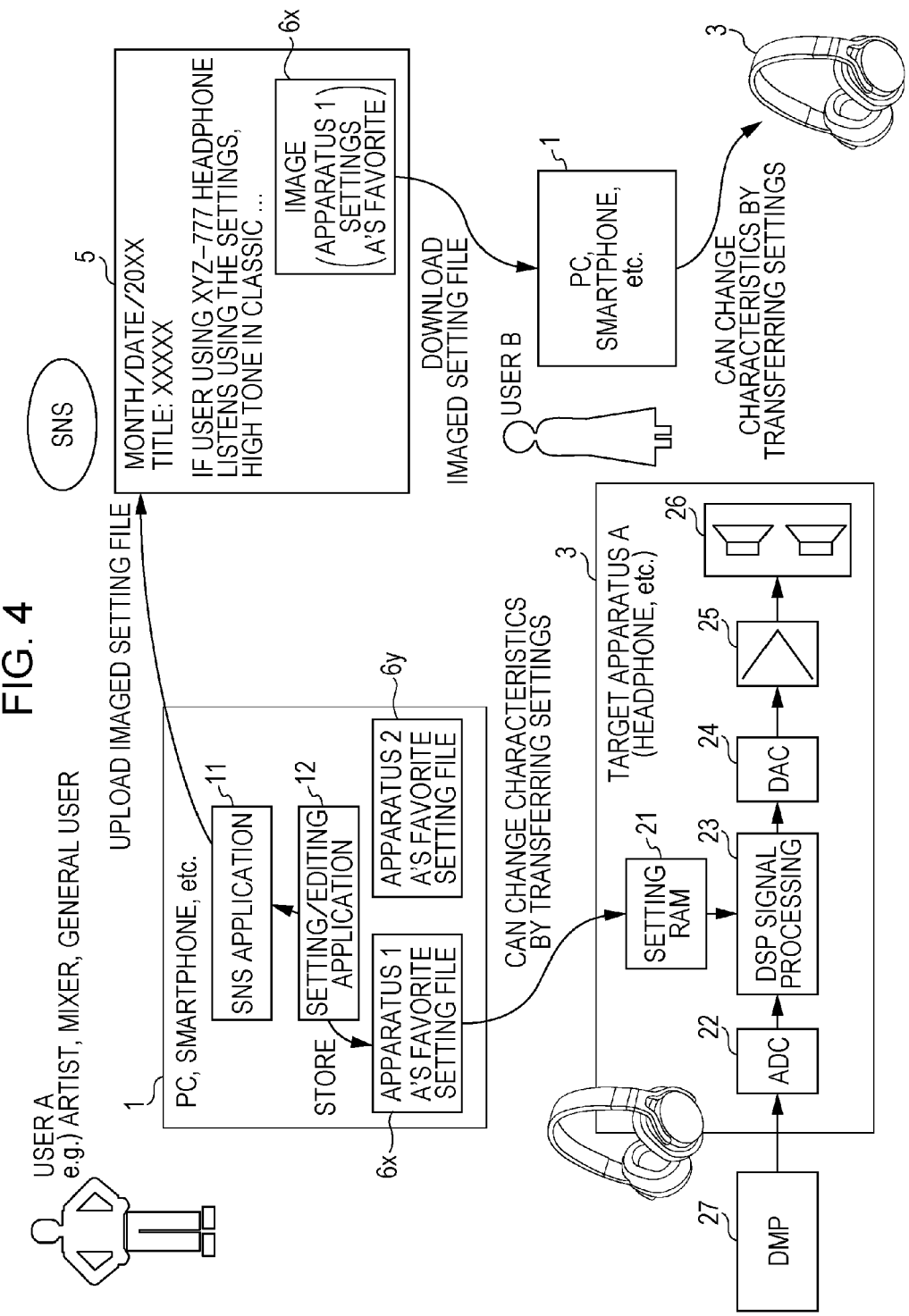
FIG. 4 is a conceptual diagram showing a system operation which is performed on an SNS for sharing setting information.

By converting parameter information into setting file image data 6 and then posting the setting file image data 6 on the bulletin board 5 of any SNS, the parameter setting file can be shared easily and conveniently. Referring to FIG. 4, this system operation will be described briefly.

In FIG. 4, parameter settings made by the user A are converted into setting file image data 6x and then posted on the bulletin board 5 of the SNS. FIG. 4 also outlines an operation where the user B downloads and uses the setting file image data 6x posted on the SNS.

As shown in FIG. 4, an information processing apparatus 1, such as a personal computer (PC) or smartphone, includes an SNS application 11 and a setting/editing application 12.

The SNS application 11 is software which allows access to the SNS. Thus, the information processing apparatus 1 can post predetermined information on the bulletin board 5 of the SNS.

The setting/editing application 12 is software for generating setting file image data 6. In this case, the set edit application 12 generates two types of setting file image data 6: setting file image data 6x and setting file image data 6y. The user A can freely generate any number of types of setting file image data 6 using the setting/editing application 12. For example, the user A can post the generated setting file image data 6x on the bulletin board 5 of the SNS using the SNS application 11.

The user B looks at the setting file image data 6x on the bulletin board 5 and downloads it to an information terminal (information processing apparatus 1) used by the user B. The user B then sets, in the equalizer of the headphone 3, the equalizer frequency characteristics settings (hereafter may be referred to as "EQ parameters") included in the setting file image data 6x. Thus, the user B can listen to music using the settings.

The setting file image data 6x may be an image such that the user B or the like can recognize the creator of the data or details of the EQ parameters. A method for generating an image which allows recognition of the creator or details will be described later. Thus, when the user B looks at the setting file image data 6x on the bulletin board 5, he or she can recognize that the setting file image data 6x has been generated by the user A and also recognize the equalizer settings. Accordingly, if the user A is a famous musician or if the equalizer settings are attractive, other users may be interested in acquiring the setting file image data 6x. Further, the user B or the like increases the enjoyment of music by listening to the music using the settings represented by the setting file image data 6x.

The user A can not only post the generated setting file image data 6x and 6y on the bulletin board 5 of the SNS but also use them in the headphone 3 used by the user A.

In this case, the user A does not necessarily have to convert the EQ parameters made by the user into setting file image data 6. That is, the user A may transfer the EQ parameters themselves to his or her own headphone 3. In the present embodiment, an example where setting file image data 6 is used will be described.

As shown in FIG. 4, the headphone 3 includes, for example, a setting RAM 21, an AD converter 22, a digital signal processor (DSP) 23, a DA converter 24, an output amplifier 25, and a speaker unit 26. Note that FIG. 4 shows a simplified two-channel stereo configuration.

A sound signal received from an external digital media player (DMP) 27 is converted by the AD converter 22 into a digital signal which is then processed by the DSP 23. In this case, the EQ parameters obtained by decoding the setting file image data 6x have been already written to the setting RAM 21. Accordingly, the DSP 23 performs equalization using the EQ parameters. The processed signal is converted by the DA converter 24 into an analog signal which is then sent through the output amplifier 25 to the speaker unit 26. As a result, the user A can listen to, from the speaker unit 26, playback sound which has been equalized using the EQ parameters extracted from the setting file image data 6.

While the headphone 3 of the user A has been described above, this operation also applies to the headphone 3 of the user B.

The system operation is outlined as described above. FIG. 4 shows the following example: the user A generates the setting file image data 6x and 6y and posts the setting file image data 6x on the bulletin board 5 of the SNS; and the user B downloads the setting file image data 6x, sets it in the headphone 3, and then listens to music. Of course, the reverse example is also possible: the user B generates setting file image data 6 and uploads it on the bulletin board 5 of the SNS; and the user A downloads and uses the uploaded setting file image data 6a.

Further, the above interaction does not necessarily have to be made between two users; any user can upload setting file image data 6 generated by the user; and any other users can download the uploaded setting file image data 6 and set it in their headphones 3. For this reason, the sharing range is wide as in FIG. 3.

2. Configuration of Information Processing Apparatus

Referring to FIG. 5, there will be described the configuration of the information processing apparatus 1 according to the present embodiment.

Figure 5A:
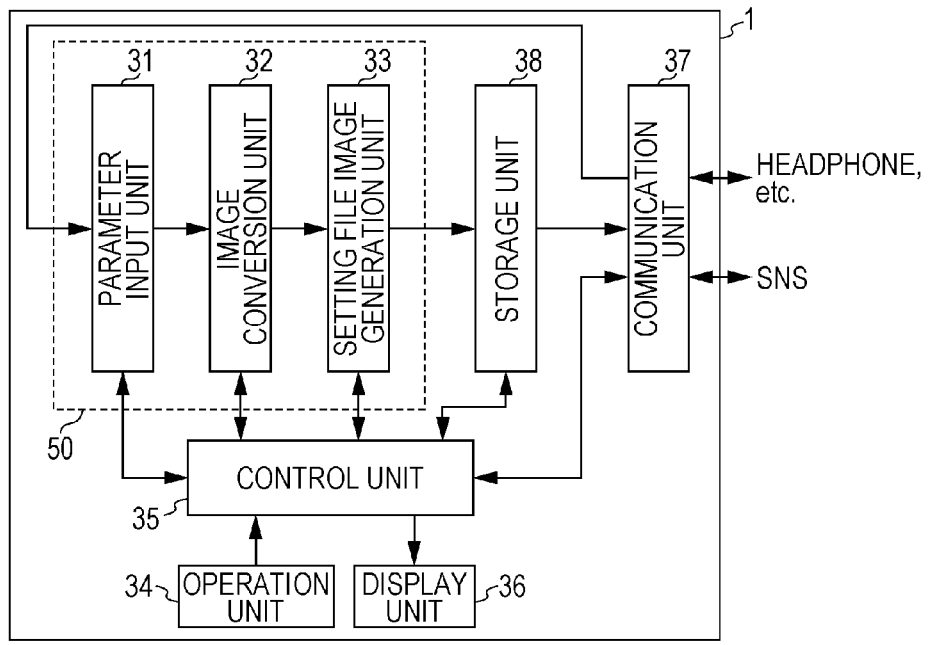
FIGS. 5A and 5B are block diagrams of an information processing apparatus according to an embodiment.
Figure 5B:
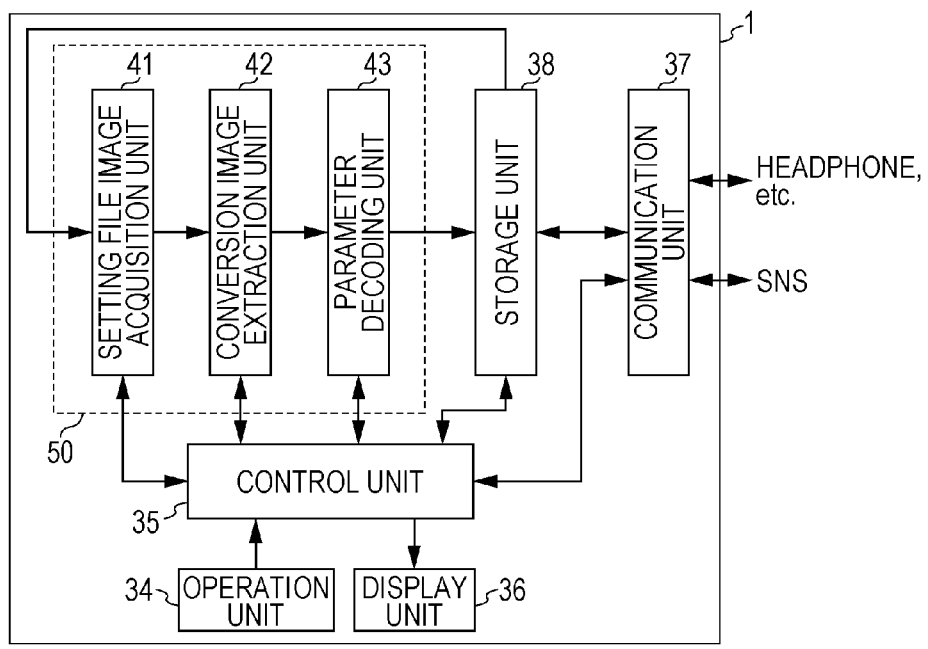

In practice, the information processing apparatus 1 includes, for example, a microcomputer including a central processing unit (CPU), a read-only memory (ROM), a random access memory (RAM), and various types of interfaces, and peripheral circuits. Specifically, the information processing apparatus 1 can be embodied as a personal computer, tablet apparatus, smartphone, or the like, as shown in FIG. 4. FIGS. 5A and 5B show functional configurations for performing the operation according to the present embodiment.

FIG. 5A shows a functional configuration for generating and uploading setting file image data 6, and FIG. 5B shows a functional configuration for downloading and using setting file image data 6. While these configurations are shown by the two diagrams for the sake of convenience, a single information processing apparatus 1 actually has both configurations (processing functions of a signal processing unit 50) in the form of software or hardware. Of course, there may be formed an apparatus dedicated to generating and uploading setting file image data 6 and an apparatus dedicated to downloading and using setting file image data 6.

As shown in FIGS. 5A and 5B, the information processing apparatus 1 includes a control unit 35, a storage unit 38, an operation unit 34, a display unit 36, a communication unit 37, and the signal processing unit 50.

The control unit 35 includes a microcomputer and controls the respective units.

The storage unit 38 is embodied as a RAM, non-volatile memory, transportable storage medium drive, or the like and used to store various types of data.

The operation unit 34 represents a keyboard, mouse, touchscreen, or other types of operating devices.

The display unit 36 is embodied as a liquid crystal display apparatus, organic electroluminescence (EL) display apparatus, or the like and shows various types of information to the user.

The communication unit 37 comprehensively represents various types of communication devices, including a communication unit for a public network such as the Internet, a Bluetooth communication unit, a USB communication unit, a cable communication unit, an infrared communication unit, a wired/wireless communication unit for a public line, and a LAN interface unit. The information processing apparatus 1 accesses any SNS or communicates with a peripheral apparatus such as a headphone through the communication unit 37.

The signal processing unit 50 is embodied as, for example, a DSP, microcomputer, or the like and performs various types of arithmetic operations.

As shown in FIG. 5A, the signal processing unit 50 includes a parameter input unit 31, an image conversion unit 32, and a setting file image generation unit 33 as functions for generating and uploading setting file image data 6.

The parameter input unit 31 captures parameters which define particular functions of the target apparatus. In this example, the parameter input unit 31 captures the EQ parameters of the headphone 3.

The EQ parameters may be set according to an operation performed on the operation unit 34 by the user and then inputted to the parameter input unit 31. The EQ parameters preset in the external headphone 3 may be inputted to the parameter input unit 31 through the communication unit 37.

The EQ parameters inputted to the parameter input unit 31 are displayed on the display unit 36. The user can edit the EQ parameters by operating the operation unit 34 while looking at the display unit 36. For example, the operator can edit (or set) the parameters by touching on the display panel of the display unit 36.

The image conversion unit 32 converts the inputted, or edited or set EQ parameters into conversion image data in a predetermined format.

The setting file image generation unit 33 generates setting file image data 6 where the conversion image data is placed in image data having a larger image size than the conversion image data.

Specific examples of these steps will be described later.

The generated setting file image data 6 is stored in the storage unit 38.

The setting file image data 6 stored in the storage unit 38 is sent, that is, uploaded to the SNS through the communication unit 37. Thus, the setting file image data 6 is posted on the bulletin board 5.

As shown in FIG. 5B, the signal processing unit 50 includes a setting file image acquisition unit 41, a conversion image extraction unit 42, and a parameter decoding unit 43 as functions for downloading and using setting file image data 6.

For example, if the user looks at the image of certain setting file image data 6 on the bulletin board 5 of the SNS and then performs a download operation, the communication unit 37 receives the setting file image data 6 through the network and stores it in the storage unit 38.

Then the setting file image acquisition unit 41 of the signal processing unit 50 reads and acquires the setting file image data 6 from the storage unit 38.

Then the conversion image extraction unit 42 extracts conversion image data from the setting file image data 6. As described above, the setting file image data 6 is data where conversion image data obtained by imaging EQ parameter information is placed in image data having a larger image size than the conversion image data. For this reason, the conversion image extraction unit 42 extracts part of the conversion image data from the setting file image data 6.

The parameter decoding unit 43 generates EQ parameters from the extracted conversion image data. This process is a process of obtaining the original EQ parameters by performing decoding corresponding to the imaging encoding performed by the image conversion unit 32 of FIG. 5A.

The EQ parameters thus obtained are stored in the storage unit 38.

The stored EQ parameters are sent from the communication unit 37 to the headphone 3 in accordance with a user operation or the like and then used as the equalizer settings of the headphone 3.

3. First Example of Generation of Setting File Image Data

An example of generation of setting file image data 6 according to the present embodiment will be described with reference to FIGS. 6 and 7. Any types of parameters can be converted into image data.

Hereafter, there will be described an example where parameter settings of the equalizer of the headphone 3 are converted into image data.

Figures 6A, 6B:
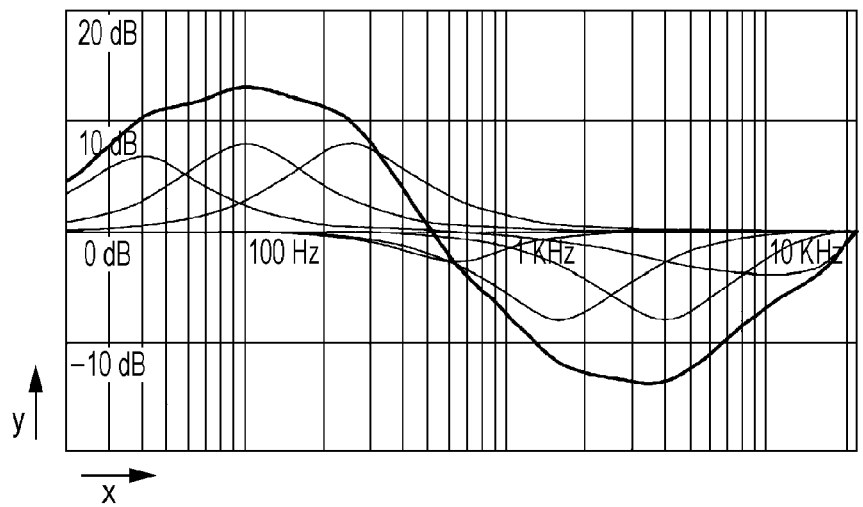
FIGS. 6A and 6B are diagrams showing waveforms and specific values for equalizer settings according to the embodiment.

FIGS. 6A and 6B show waveforms (frequency characteristics) representing equalizer settings and specific values of the waveforms. FIG. 6A shows equalizer settings in the form of waveforms. The horizontal axis represents the frequency (Hz), and the vertical axis represents the gain (dB). The user himself or herself can generate or edit these waveforms on the information processing apparatus 1. Alternatively, the user can input the equalizer settings from the headphone 3 to the information processing apparatus 1 and then generate waveforms from the settings or edit the settings.

The user of the information processing apparatus 1 can render waveforms (frequency characteristics) representing EQ parameters, for example, by operating the touchscreen.

Frequency characteristics shown by thin lines in FIG. 6A indicate that the waveform is changed by operating the touchscreen (by moving the fingertip). The movement track of the user's fingertip corresponds to audio signal frequency characteristics desired by the user, and settings which are closest to those desired by the user are obtained in accordance with the resources (band number, band upper limit, and the like) of the headphone 3. A waveform shown by a thick line in FIG. 6A represents finally determined frequency characteristics values.

FIG. 6B shows specific values of the respective frequencies of the waveform of FIG. 6A. x represents a coordinate on the horizontal axis of the screen whose left end is zero. y represents a coordinate on the downward vertical axis of the screen whose upper end is zero. Hz and dB represent frequency values (Hz) and gain values (dB) obtained by converting x and y coordinates. Note that these values are illustrative only and are not values corresponding to the waveform of FIG. 6A.

The x and y values, which are the frequency characteristics values set using the thick line in FIG. 6B, are x and y coordinate values in the frequency characteristics rendering area of the display unit 36. The information processing apparatus 1 acquires, as gain values (dB), y coordinate values corresponding to the x coordinate values (0, 5, 10, etc.) of fixed points (e.g., 128 points) on the x axis. The y coordinate values corresponding to the x coordinate values refer to the coordinate values of the thick line of FIG. 6B and represent gain values (dB). The points on the x axis correspond to frequency values (Hz). For example, the points on the x axis are frequency values in a range of 20 Hz to 22.05 KHz.

Hereafter, traditional image data generation methods will be described.

If parameter information is for use in digital apparatuses, it may be converted into a standardized file such as an XML file. The parameter information may also be converted into a file in a format specific to the apparatus. However, inconveniently, there is a limitation to the types of files that can be uploaded, depending on the system.

The method of using a QR® code is also conceivable. A QR code is obtained by imaging information and can be captured by a camera. When the user takes a glance at a QR code, he or she can understand how to capture it. QR codes are easy to use and convenient. However, a QR code includes only a small amount of information.

A method of embedding parameters in a TAG region is conceivable. However, the user has difficulty in knowing the information embedded in this region by only normal means (an act of seeing an image). While the user may be able to know that the region is a setting file from some symbols or the like, he or she does not understand the difference. To begin with, it is difficult to use this method in an image format including no TAG region.

If the frequency characteristics of FIGS. 6A and 6B are edited, a method of converting the characteristics into an image and then storing the image is conceivable. However, the image is large in size. Accordingly, when the user compresses the image, he or she has difficulty in recognizing features of the frequency characteristics at a glance.

While a method of inputting a watermark is also conceivable, the user has difficulty in recognizing the difference between the parameters at a glance.

In view of the foregoing, image data is generated as follows in the present embodiment.

Typical examples of image file formats include Microsoft Windows Bitmap Image (BMP), Joint Photographic Experts Group (JPEG), Graphics Interchange Format (GIF), and Portable Network Graphics (PNG). Hereafter, an example where a PNG file is generated will be described. However, any storage/compression file formats other than PNG may be used as long as the original color information can be completely correctly restored from the stored file.

Note that for imaging, a method of imaging the gain value of each band of the target apparatus may be employed. However, if the user reads a setting file 2 for a headphone including a 31-band equalizer and incorporates the file into the headphone including a 3-band equalizer, he or she has to perform an exceptional process on the headphone. This is because the image is significantly changed according to the resources of the headphone. For this reason, in the present technology, values [gain values (dB)] on the vertical axis corresponding to fixed points (e.g., 128 points described above) on the horizontal axis are converted into image data.

Referring to FIG. 7, an image data generation method and an example of image data generation according to the present embodiment will be described specifically. Generation of image data is performed in two stages. First, the gain values on the vertical axis are converted into pieces of color image data, respectively. The pieces of color image data refer to pieces of conversion image data generated by the image conversion unit 32.

Next, image data including the pieces of conversion image data (color image data) is converted into a predetermined file format (PNG format). The resulting file refers to the setting file image data 6 created by the setting file image generation unit 33.

First, the pieces of conversion image data generated by the image conversion unit 32 will be described.

The image conversion unit 32 generates the pieces of conversion image data by converting values included in the parameter information into pieces of color information or transparency information.

Specifically, the image conversion unit 32 directly converts the gain values into pieces of color information. Colors can be represented by combining R (red), G (green), B (blue), and α (transparency). The present embodiment assumes that predetermined colors represented by combining R (red), G (green), B (blue), and α (transparency) are converted into images. Of course, the three primary colors, R (red), G (green), and B (blue), may be combined.

FIG. 7A shows specific values necessary to convert the settings of FIGS. 6A and 6B into image data. That is, FIG. 7A shows the gain values (dB) of the points on the horizontal axis of FIG. 6A in the form of a table of values for image data generation. The values are represented by 32-bit floating point numbers. FIG. 7A shows only the values corresponding to 19 points.

The 32-bit values representing gain values (dB) in FIG. 7A are each divided into 8-bit values, which are then assigned to R, G, B, and α.

For example, the value of the first point is "C080AAAAh" ("h" represents hexadecimal notation). In this case, C0h is assigned to an α value, 80h to an R value, AAh to a G value, and AAh to a B value. The R, G, B, and α values are each represented by 8 bits and therefore each take a maximum of 255 in decimal notation.

Each value corresponds to one pixel on the screen. That is, color of one pixel correlated to each gain (dB) is determined.

In this way, the gain values of the 128 points are converted into pieces of color information. Thus, image data of 128 pixels is generated. FIG. 6B shows an example of conversion image data 6a of 1 pixel×128 pixels. While the conversion image data 6a is vertically extended in the diagram, it is actually color information corresponding to one line.

Figure 7B:

While setting file image data 6 can be obtained by simply storing conversion image data 6a as shown in FIG. 7B in PNG format, the user has difficulty in visually recognizing the image of 1 pixel×128 pixels. Further, an application program for using setting file image data 6 has difficulty in determining whether such setting file image data 6 is a parameter setting file.

For these reasons, in the second stage, the setting file image generation unit 33 generates setting file image data 6 where the above conversion image data 6a is placed in image data having a larger image size than the conversion image data 6a. The user can visually recognize, as an image, the conversion image data 6a thus generated.

The setting file image generation unit 33 incorporates, into the setting file image data 6, recognition image data obtained by imaging recognition information for recognizing that the setting file image data 6 is an image including conversion image data.

First, there will be described the recognition image data, which is intended to cause the user to recognize the setting file image data 6 on the application.

Specifically, an identification tag is embedded in the setting file image data 6. As used herein, "embedding an identification tag" refers to placing an identification tag not on a text area but on an image.

Figure 7C:

A universally unique identifier (UUID) or the like is used as an identification tag. As in the above color imaging, the value of this identification tag is converted into an RGBα image. In this case, the RGBα image may be visually hidden by maximizing the transparency. FIG. 7C shows an example of recognition image data 6b obtained by imaging an identification tag (in this drawing, the recognition image data 6b is enlarged and vertically extended for descriptive purposes). The identification tag thus imaged includes not only the information indicating that the image is the setting file image data 6 according to the present embodiment but also information indicating the target apparatus (headphone 3 or the like). For example, information which allows identification of the target apparatus, such as the UUID thereof, is incorporated into the identification tag as data.

Figure 7D:
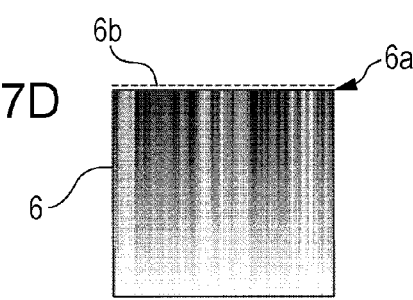

As described above, the setting file image generation unit 33 generates setting file image data 6 including conversion image data 6a and recognition image data 6b so that the user can recognize the setting file image data 6 as an image. FIG. 7D shows an example of such setting file image data 6.

This setting file image data 6 is image data having a larger image size than the conversion image data 6a and is, for example, an approximately square image, as shown in FIG. 7D. In this example, the square image is generated by vertically extending the 128-pixel conversion image data 6a while performing gradation. For example, the conversion image data 6a is placed in the first line, and pieces of data obtained by gradually changing the α value with respect to the respective values of the conversion image data 6a of 1 pixel×128 pixels are placed in the second to 128-th lines. Thus, an image of 128 pixels×128 pixels is generated.

Further, the recognition image data 6b is placed in a predetermined position (shown by a broken line in FIG. 7D).

Thus, there is generated setting file image data 6 where the conversion image data 6a including EQ parameter information and the recognition image data 6b including identification tag information are placed in the predetermined positions of image data having a larger image size than the conversion image data 6a.

The setting file image data 6 thus generated is stored, for example, in PNG format.

The image of the resulting setting file image data 6 is an approximately square image which the user can visually recognize. While the square image is generated using the conversion image data 6a in the above example, various examples are conceivable. While, in the example of FIG. 7D, an image dramatizing effect is obtained by vertically performing transparency gradation, the 128-pixel data, of course, may be simply copied to the respective lines without performing gradation.

Another conceivable method is to place the recognition image data 6b in the lowest position and performing gradation between two colors at the upper and lower edges.

The following method may also be used: image data having a predetermined shape such as a square shape is used instead of the conversion image data 6a, and the conversion image data 6a or recognition image data 6b is placed on part of the image data.

The recognition image data 6b may be generated as follows: conversion into only R, G, and B values is performed, and the resulting image data is hidden from the eyes of the user by maximizing the transparency α.

Of course, there is no limitation to the shape or size of the image of the setting file image data 6.

The conversion image data 6a and recognition image data 6b may be positioned in various positions. In any case, it is only necessary to allow the application to find the conversion image data 6a or recognition image data 6b in the setting file image data 6 and to acquire information from the found data.

While the user can recognize even setting file image data 6 as shown in FIG. 7D as a file which is obtained by converting parameter settings into image data and storing the image data, user recognizability may be increased.

For example, to indicate the function of the setting file image data 6, that is, the function (service) which allows sharing of parameter information, a logo image indicating that the setting file image data 6 is an image including the conversion image data 6a may be added.

Figure 7E:
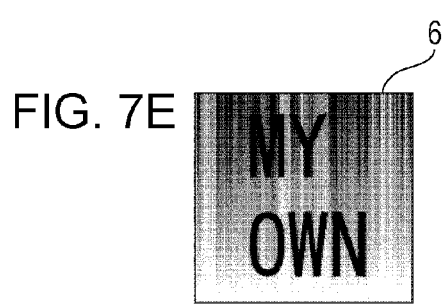

FIG. 7E shows setting file image data 6d where a mark "MY OWN" is placed as a logo. Of course, the logo is illustrative only. Assuming that the logo image is placed as described above, when the user looks at the image on the bulletin board 5 or the like, he or she can easily recognize that the image is setting file image data 6, which allows sharing of parameter information.

Figure 7F:
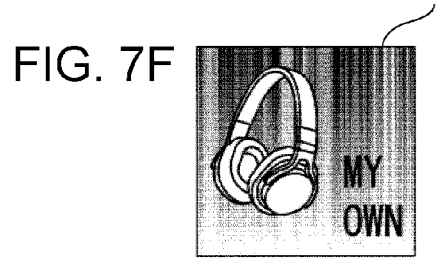

FIG. 7F shows setting file image data 6 including the image of the target apparatus. Such a display allows the user to recognize the target apparatus at a glance.

When the user recognizes this apparatus, he or she can determine by himself or herself whether he or she can use or wants to use the setting file image data 6.

Figure 7G:
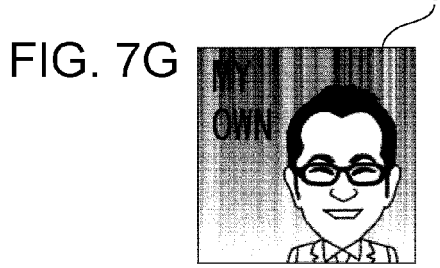

FIG. 7G shows setting file image data 6 including an image indicating the creator of the parameter information, such as an avatar or photograph of the creator.

Thus, the user can easily recognize the creator of the setting file image data 6. The creator can generate setting file image data 6 with fun, whereas the user can recognize the creator and determine whether he or she will use the setting file image data 6.

4. Second Example of Generation of Setting File Image Data

Figure 8:
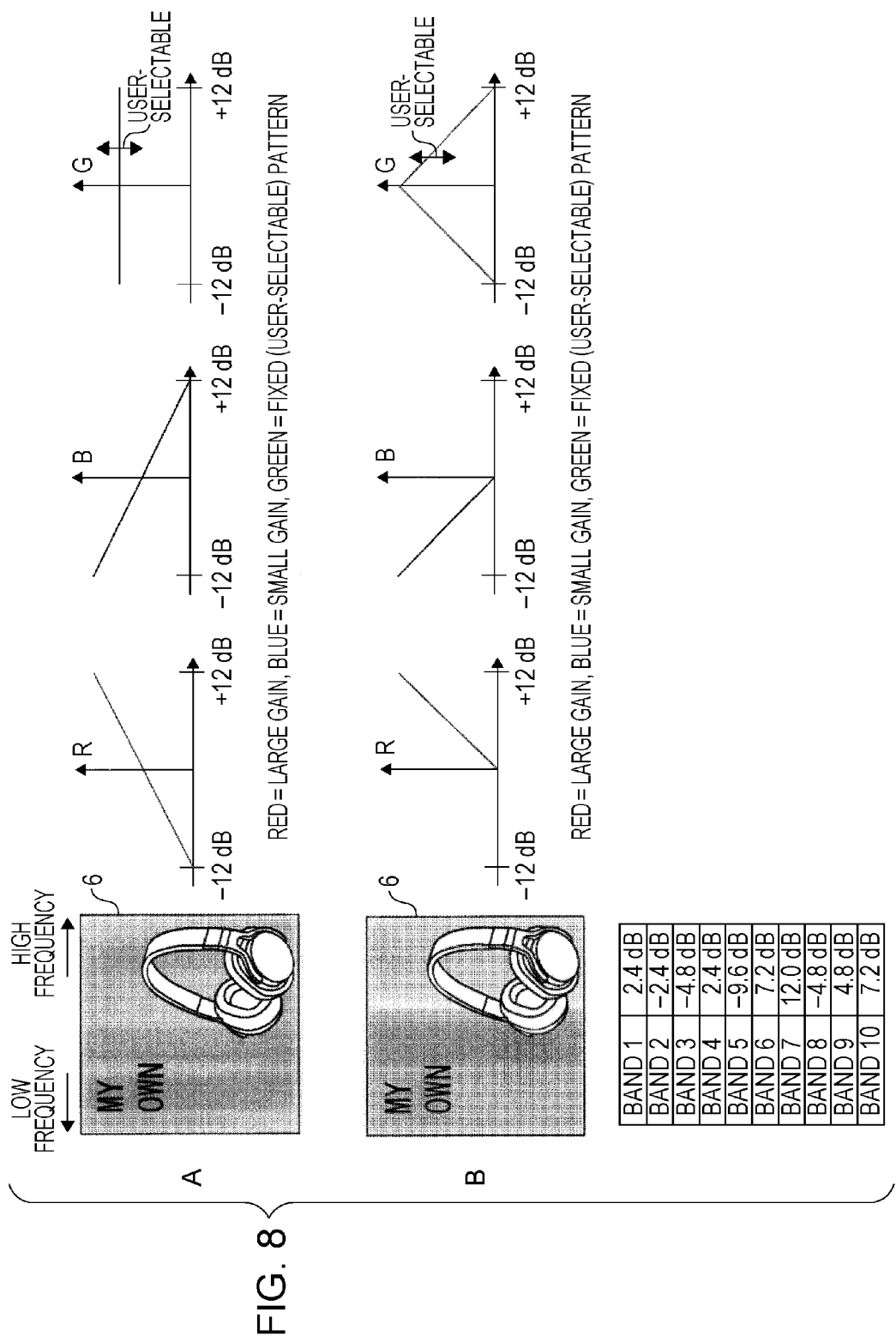
FIGS. 8A and 8B are diagrams showing a second example of generation of setting file image data according to the embodiment.
Figure 9:
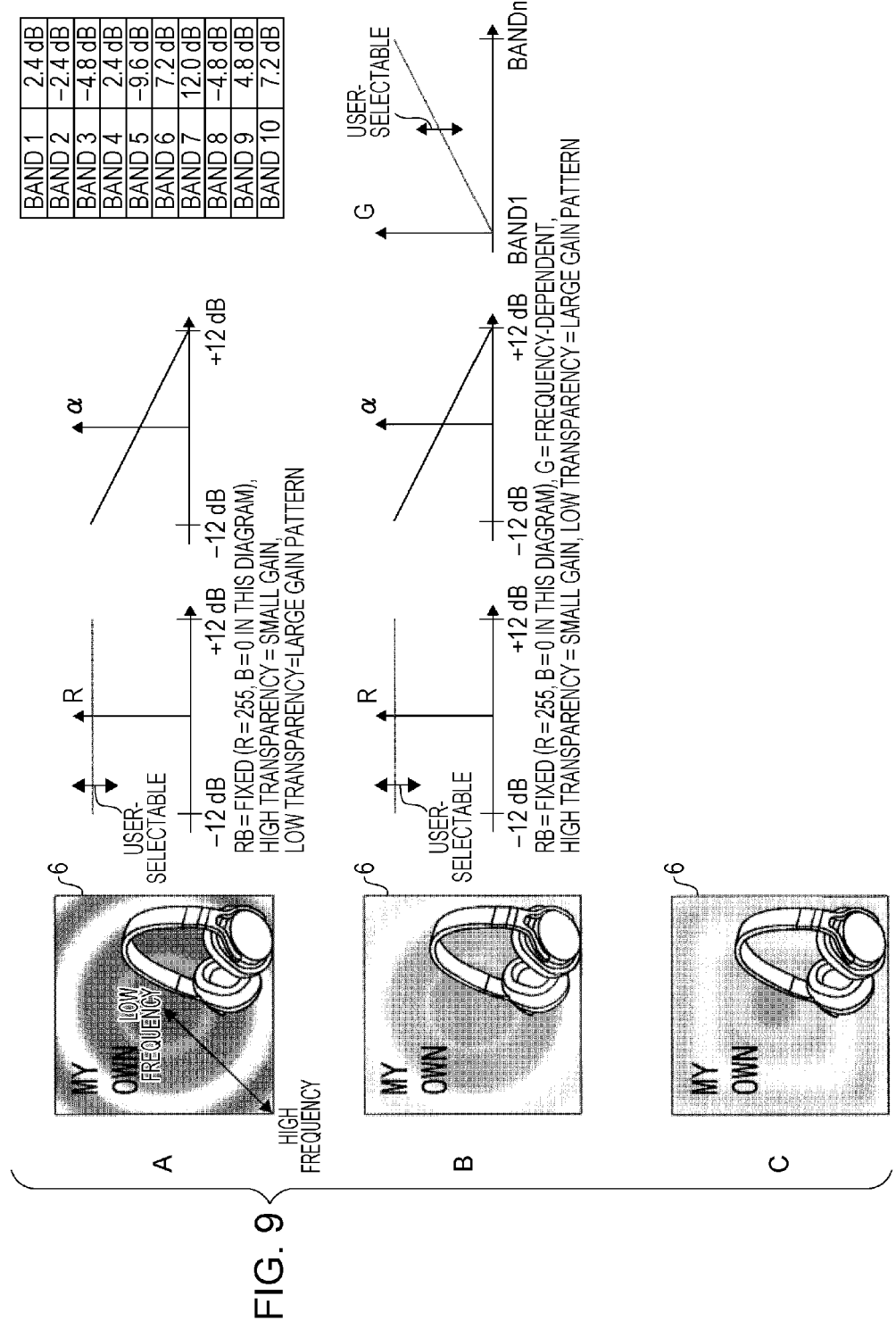
FIGS. 9A to 9C are diagrams showing the second example of generation of setting file image data according to the embodiment.

In the first example of generation of setting file image data shown in FIG. 7, the image conversion unit 32 generates conversion image data 6a by converting values included in parameter information into color information or transparency information. Referring to FIGS. 8 and 9, there will be described a second example of generation of setting file image data. In this example, the image conversion unit 32 generates conversion image data by converting values included in parameter information into color information or transparency information in accordance with a conversion pattern.

The conversion image data 6a described with reference to FIGS. 7A to 7G is generated by assigning each set gain value of the equalizer to pieces of color information, R, G, B, and α, respectively, and then converting the pieces of color information into colors corresponding to the assigned values. In this case, if the value is larger, the luminance of the color simply becomes higher. For example, if the R value is larger, the luminance of red becomes higher.

On the other hand, color conversion is performed by changing the R, G, B, and α values in given relationships. Hereafter, a setting where the R, G, B, and α values are changed in given relationships is referred to as a conversion pattern.

In the conversion pattern of FIG. 8A, as the gain value is smaller, the luminance of B becomes higher (inversely proportional relationship), and the luminance of R becomes lower (proportional relationship). As the gain value is larger, the luminance of R becomes higher (proportional relationship), and the luminance of B becomes lower (inverse proportional relationship). G is constant with respect to the gain.

Note that the user can select (change) the magnitude of G.

Setting file image data 6 shown in FIG. 8A is an example display obtained by imaging the settings in a table below FIG. 8A in accordance with a B, R, and G conversion pattern as described above.

Although it is not easy to understand the relationship between the settings and the display in the monochrome diagram, the display is approximately as follows. In the diagram, a lightly colored display portion is a portion where red is displayed with high luminance, and a highly colored display portion is a portion where blue is displayed with high luminance.

Thus, since the gain of band 1 (lowest range) has a large value of 2.4 dB, red is lightly highlighted.

Since the gains of bands 2 and 3 are small (−2.4 dB, −4.8 dB), blue is intensely highlighted.

Since the gain of band 4 is large (2.4 dB), red is lightly highlighted.

Since the gain of band 5 is small (−9.6 dB), blue is intensely highlighted.

Since the gains of bands 6 and 7 are smaller (7.2 dB, 12 dB), red is lightly highlighted.

Since the gain of band 8 is small (−4.8 dB), blue is intensely highlighted.

Since the gains of bands 9 and 10 (high ranges) are large (4.8 dB, 7.2 dB), red is lightly highlighted.

As seen above, features of the frequency characteristics can be flexibly represented by the color differences. Since colors are actually displayed, the differences can be represented more precisely.

If the user knows hue tendencies based on the conversion pattern, he or she can roughly grasp the tendencies of available EQ parameters when he or she looks at the setting file image data 6. For example, the user can recognize frequency characteristics such as "high frequency-oriented," "low frequency-oriented," or "substantially flat."

In the conversion pattern of FIG. 8B, when the gain is smaller than zero, R is not displayed; as the gain is smaller, the luminance of B becomes higher (inverse proportional relationship). When the gain is greater than zero, B is not displayed; as the gain is greater, the luminance of R becomes higher (inverse proportional relationship). For G, as the gain is smaller than zero, the luminance thereof becomes lower (inverse proportional relationship); as the gain is greater than zero, the luminance thereof becomes lower (inverse proportional relationship). Addition of G to R or B makes a given value (e.g., 255). The user can select (change) the magnitude of G when the gain is zero.

In FIG. 8B, a lightly colored portion is a portion where red is highlighted; an intensely colored portion is a portion where blue is highlighted. These are similar to those in FIG. 8A. A portion displayed with a density which is intermediate between those of R and B is a portion where green is highlighted.

The relationship between the settings and the display based on the above R, B, and G conversion pattern is approximately as follows. When the gain is close to zero, G is highlighted. When the gain is smaller than zero, R is not displayed and therefore a color which is a mixture of B and G is displayed. As the gain is smaller, B is highlighted. When the gain is greater than zero, B is not displayed and therefore a color which is a mixture of R and G is displayed. As the gain is greater, R is highlighted.

In bands 1 (lowest range), 2, 3, and 4, the gains are close to zero, and G is highlighted with a density which is intermediate between those of R and B. In band 5, the gain is small (−9.6 dB), and B is intensely highlighted.

In bands 6 and 7, the gains are large (7.2 dB, 12 dB), and red is lightly highlighted.

In band 8, the gain (−4.8 dB) is smaller than those of bands 1, 2, 3, and 4 and therefore blue is slightly intensely highlighted.

In bands 9 and 10, the gains (4.8 dB, 7.2 dB) are smaller than those of bands 6 and 7 and therefore red is highlighted. However, the red is displayed not more lightly than bands 6 and 7 but slightly more intensely than bands 6 and 7.

As in FIG. 8A, features of the frequency characteristics can be flexibly represented by the color differences. Since colors are actually displayed, the differences can be represented more precisely. Thus, when the user looks at the image of the setting file image data 6, he or she can know the tendencies of the EQ parameters.

FIGS. 9A to 9C show other examples of the conversion pattern and the placement of the conversion image data 6a. While FIG. 8 shows the placement of the conversion image data 6a, that is, the lower range-to-higher range display of the equalizer on the horizontal axis, FIG. 9 shows an example of the placement of such a display in a radiate circular shape.

In an example of FIG. 9A, the central portion of the display represents the lowest range, and the settings are displayed in colors in a radiant circular shape toward the highest range on a diagonal line. Colors are displayed by combining R, G, B, and α. As in FIGS. 8A and 8B, the equalizer settings are shown using 10 bands as an example. The setting values are as shown in a table on the right of the screen and are the same as those in FIGS. 8A and 8B. Similarly, gains (dB) which can be set in the equalizer are −12 dB to +12 dB.

In the conversion pattern of FIG. 9A, with R fixed to the largest value in a variable range and with B and G being zero, as the set gain is smaller, α becomes larger (inversely proportional relationship). An image display in this state is a display where R is predominant and where α (transparency) changes according to the set gain of the equalizer.

Since FIG. 9A is monotone, an intensely colored portion corresponds to R (red), and a lightly colored portion is a portion where α (transparency) is increased. For this reason, when the setting values of the equalizer are small, a lightly colored display is made; when the setting values are large, an intensely colored display is made.

The relationship between the settings and the display is approximately as follows. Since the center of the screen represents the lowest range, the central portion corresponds to band 1. The sections of the diagonal correspond to bands 2 to 10, and the end thereof corresponds to band 10.

The conversion pattern of FIG. 9B include a pattern about R and α similar to that in FIG. 9A, as well as a pattern about G whose horizontal axis represents bands 1 to n. That is, G is increased from a lower range toward a higher range.

An image display in this state is a display where the G tendency is larger in a higher range, compared to the display example of FIG. 9A.

The conversion pattern of FIG. 9C is similar to that of FIG. 9B. However, in this example, the conversion image data 6a is placed in a radiant square shape.

As described above, the visual impression of the setting file can be changed by using pieces of color information R, B, G, and α as variables and setting these variables. Thus, the creator of the setting file image data 6 can represent features of the setting file image data 6.

For example, depending on the conversion pattern or the placement of the conversion image data 6a, it is also possible to indicate the creator, the target apparatus, or the type of EQ parameters (jazz parameters, pop parameters, etc.).

Further, the user who generates setting file image data 6 can select among the above conversion patterns or download a conversion pattern.

5. Initial Communication with Target Apparatus

Hereafter, an example of a process performed by the information processing apparatus 1 according to the present embodiment will be described.

First, the initial communication thereof with the target apparatus such as the headphone 3 will be described with reference to FIG. 10.

Figure 10:
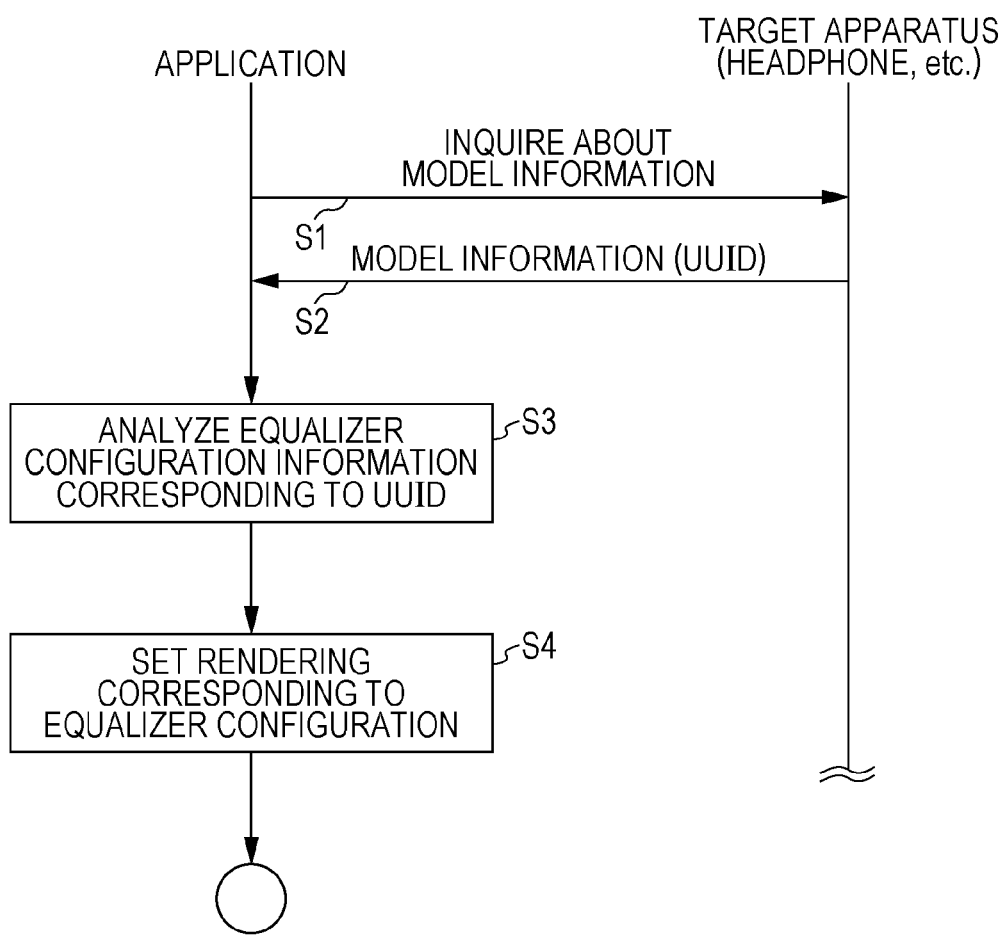
FIG. 10 is a flowchart showing an image generation operation according to the embodiment.

FIG. 10 shows a process where the information processing apparatus 1 receives predetermined information from the target apparatus (headphone, etc.) under the control of an application program run by the control unit 35 thereof.

In step S1, the control unit 35 inquires of the headphone 3 about model information through the communication unit 37.

In step S2, the control unit 35 receives model information (e.g., UUID) from the headphone 3 through the communication unit 37.

In step S3, the control unit 35 analyzes the received model information.

In step S4, the control unit 35 makes rendering settings corresponding to the equalizer configuration (settings such as band number).

By performing such communication, the information processing apparatus 1 can read the current EQ parameters from the headphone and display them on the display unit 36 so that the user can edit the settings, so as to generate setting file image data 6a.

On the other hand, an information processing apparatus 1 which downloads and uses the setting file image data 6 can check whether the target apparatus, with which the information processing apparatus 1 communicates, is a model which can use parameter information included in the setting file image data 6.

6. Setting File Image Data Generation Process

Figure 11A:
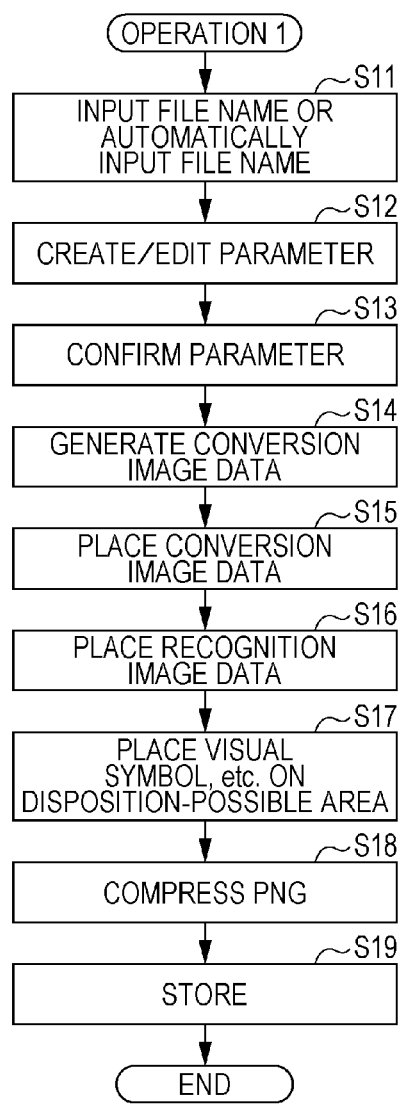
FIGS. 11A and 11B are flowcharts showing image generation operations according to the embodiment.

Next, referring to FIGS. 11A and 11B, an example of the process of generating setting file image data 6 will be described. FIG. 11A corresponds to the first example of generation of setting file image data, and FIG. 11B corresponds to the second example of generation of setting file image data.

First, the process of FIG. 11A will be described.

In step S11, a file name is inputted under the control of the control unit 35. In this case, the file name may be inputted automatically or inputted manually through an operation of the operation unit 34. After the file name is inputted automatically or manually, the process of the control unit 35 proceeds to step S12.

In step S12, the display unit 36 displays a rendering of the equalizer characteristics under the control of the control unit 35. For example, the display unit 36 displays the equalizer parameters read from the headphone or the like through communication so that the user can edit the parameters, as shown in FIG. 10, or displays an image so that the user can newly set the equalizer parameters. On the other hand, the user performs an input operation to set or edit the equalizer parameters as desired.

When the newly set or edited parameter information, which serves as the source of setting file image data 6, is confirmed, the parameter input unit 31 of the signal processing unit 50 captures the parameter information in step S13.

In step S14, the signal processing unit 50 generates conversion image data 6a under the control of the control unit 35. For example, as described above, the image conversion unit 32 of the signal processing unit 50 generates conversion image data 6a from the parameter information by dividing a 32-bit gain value corresponding to each frequency into pieces of 8-bit data and then assigning the pieces of 8-bit data to α, R, G, and B values, respectively.

In steps S15 to S18, the signal processing unit 50 generates setting file image data 6 using the function of the setting file image generation unit 33.

In step S15, the signal processing unit 50 places the conversion image data 6a in an image serving as the setting file image data 6. For example, as shown in FIG. 7D, the conversion image data 6a is incorporated into part of square setting file image data 6.

In step S16, the signal processing unit 50 places recognition image data 6b in the image data.

In step S17, the signal processing unit 50 places, in the image, a logo mark, an image of the target apparatus, an avatar, or the like serving as a visual symbol.

In step S18, the signal processing unit 50 compresses the image data thus generated in PNG format.

In step S19, the control unit 35 stores, in the storage unit 38, the setting file image data 6 generated by the signal processing unit 50.

Through the above steps, the setting file image data 6 is generated.

Next, FIG. 11B will be described.

Figure 11B:
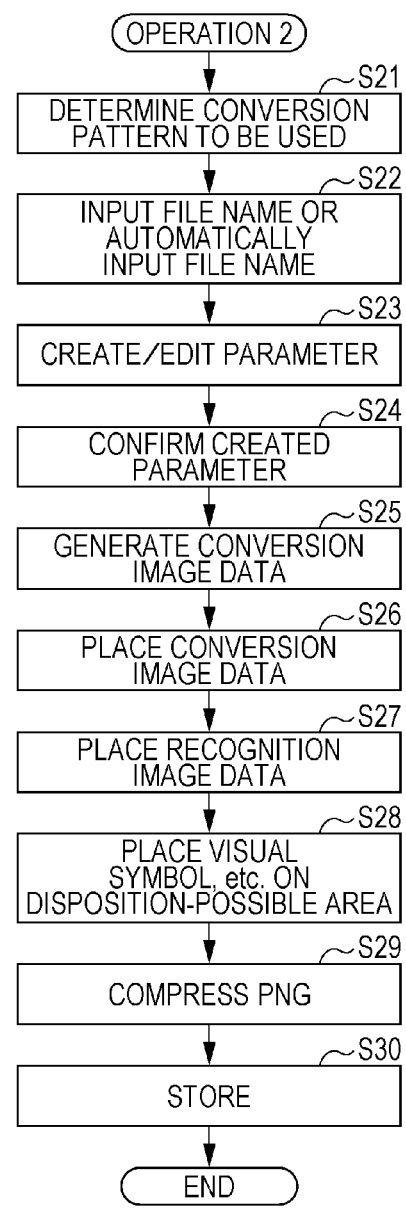

The only difference between FIG. 11B and FIG. 11A is that step S21 is added. In step S21, a conversion pattern to be used is determined.

The conversion pattern may be determined according to a user selection or selected according to the category of music, the target apparatus, or the like. Alternatively, a fixed conversion pattern may be usually used.

Steps S22 to S30 are similar to steps S11 to S19 of FIG. 11A. Note that in the generation of conversion image data 6a in step S25, the conversion pattern determined in step S21 are used, and imaging as described with reference to FIGS. 8 and 9 is performed.

7. Process Using Setting File Image Data

Next, referring to the flowcharts of FIGS. 11A and 11B, there will be described a process that the information processing apparatus 1 according to the present embodiment performs using the setting file image data 6.

Specifically, the process refers to an operation where the information processing apparatus 1 performs steps using the setting file image data 6 downloaded from the bulletin board 5 of the SNS and finally sets, in the external headphone 3, the EQ parameters included in the setting file image data 6.

An application program in the information processing apparatus 1 causes the control unit 35 to perform this process.

Figure 12:
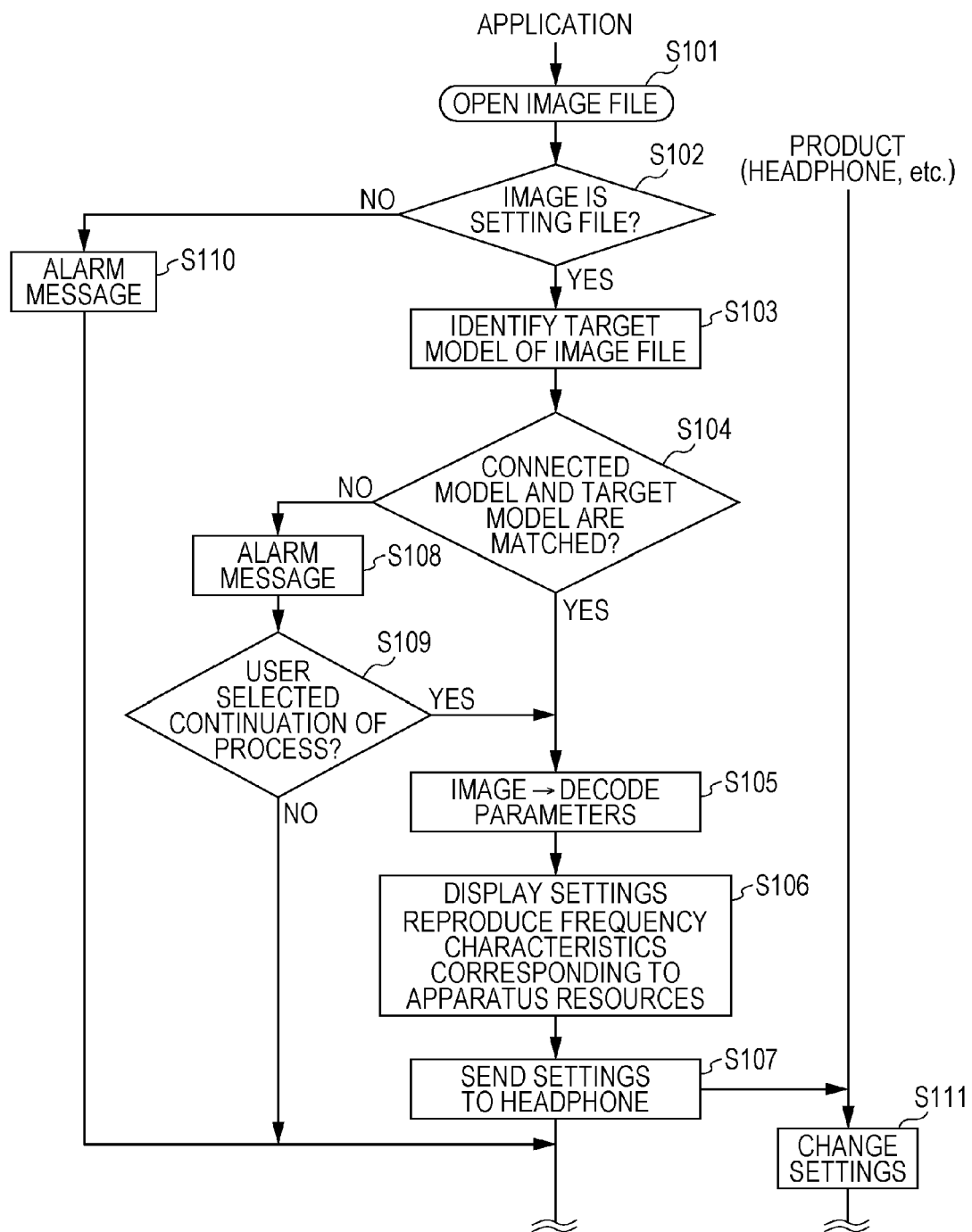
FIG. 12 is a flowchart showing a read operation according to the embodiment.

FIG. 12 is a flowchart showing a process where the information processing apparatus 1 analyzes the downloaded setting file image data 6 and sets, in the target apparatus (headphone 3 or the like), the equalizer settings included in the setting file image data 6.

Note that FIG. 12 assumes that after performing network communication through the communication unit 37 and thus downloading, for example, setting file image data 6 posted on the SNS, the information processing apparatus 1 is storing an image file as the setting file image data 6 in the storage unit 38.

In step S101, the control unit 35 opens and reads the image file (setting file image data 6) stored in the storage unit 38.

In step S102, the control unit 35 determines whether the image file is the setting file image data 6. This is a process of checking whether the file includes recognition image data 6b and whether the recognition image data 6b is appropriate information.

If the image file is not setting file image data 6, the control unit 35 proceeds to step S110 to display an alarm message on the display unit 36 and then ends the process.

If the control unit 35 confirms that the image file is setting file image data 6, it proceeds to step S103 to identify the model of the target apparatus (headphone 3 or the like) from the recognition image data 6b.

In step S104, the control unit 35 determines whether the model of the headphone 3 which is connected (or can be connected) to the information processing apparatus 1 including the control unit 35 for communication and the model of the target apparatus confirmed in step S103 are matched. Since the model of the connected headphone 3 has been obtained through steps S1 and S2 in the initial communication of FIG. 10, the control unit 35 checks whether the model confirmed in step S103 and the model obtained through steps S1 and S2 of FIG. 10 are matched.

If the model of the connected headphone 3 and the model corresponding to the setting file image data 6 are not matched, the process proceeds to step S108. In this step, the control unit 35 displays an alarm message on the display unit 36. Then the process proceeds to step S109.

In step S109, the display unit 36 shows the user that the connected apparatus is not the model corresponding to the setting file image data 6 and requests the user to make a selection. This is because although the connected apparatus does not directly correspond to the setting file image data 6, it may be able to use the EQ parameters or the like.

If the user selects the continuation of the process, the process proceeds to step S105. If the user does not select the continuation of the process, the process ends.

In step S105, the control unit 35 causes the signal processing unit 50 to extract the conversion image data 6a from the setting file image data 6 and to decode the conversion image data 6a. Specifically, the control unit 35 causes the setting file image acquisition unit 41 of FIG. 5B to acquire the setting file image data 6 from the storage unit 38. Then the control unit 35 causes the conversion image extraction unit 42 to extract the conversion image data 6a from the setting file image data 6. Then the control unit 35 generates EQ parameters from the conversion image data 6a. That is, the control unit 35 causes the parameter decoding unit 43 to perform a decoding process corresponding to the imaging encoding performed by the image conversion unit 32 of FIG. 5A. Specifically, the parameter decoding unit 43 converts the $\alpha$, R, G, and B values of each of 1×128 pixels back into gain values and regards these gain values as the gain values of the 128 points on the frequency axis.

Thus, the EQ parameter information of equalizing characteristics based on the original gain values of the 128 points is obtained.

In step S106, the control unit 35 causes the signal processing unit 50 to reproduce frequency characteristics corresponding to the resources of the connected target apparatus (headphone). For example, the decoded EQ parameters are 128-band frequency characteristics information, and if the equalizer of the headphone 3 has six bands, the decoded EQ parameters are converted into 6-band EQ parameters.

The control unit 35 causes the signal processing unit 50 to perform the above process and thus to reproduce the EQ parameters for the headphone 3 and then stores the EQ parameters in the storage unit 38.

In step S107, the control unit 35 causes the communication unit 37 to send the stored EQ parameters to the headphone 3.

In step S111, the headphone 3 receives the EQ parameters and changes the existing equalizer settings to the received EQ parameters.

Through the above steps, it is possible to change the parameter settings of the target apparatus, such as the headphone 3, using the setting file image data 6 downloaded to the information processing apparatus 1.

Through these steps, as described above, the user can perform such as changes to the settings of his or her own headphone 3 using setting file image data 6 provided to the public.

8. Program and Modification

Programs according to the present embodiment are programs which cause an arithmetic processing apparatus, such as a CPU or DSP, to perform the process performed by the information processing apparatus 1 described in the above embodiment.

Specifically, the program for causing an arithmetic processing apparatus to generate setting file image data 6 causes an arithmetic processing apparatus to perform a process of inputting parameter information for setting the operating state of the target apparatus, a process of generating conversion image data 6a by imaging the parameter information, and a process of generating setting file image data 6 where the conversion image data 6a is placed in image data having a larger image size than the conversion image data 6a.

That is, this program causes the arithmetic processing apparatus to perform the process shown in FIG. 11A or 11B.

On the other hand, the program for causing an arithmetic processing apparatus to perform a process using setting file image data 6 causes an arithmetic processing apparatus to perform a process of receiving setting file image data 6, a process of extracting conversion image data 6a from the setting file image data 6, and a process of generating parameter information from the conversion image data 6a.

That is, this program causes the arithmetic processing apparatus to perform the process shown in FIG. 12.

These programs allow the arithmetic processing apparatuses to serve as the information processing apparatus 1.

These programs may be previously recorded in a hard disk drive (HDD) serving as a recording medium which is included in an apparatus such as a computer apparatus, a read-only memory (ROM) in a microcomputer including a CPU, or the like.

These programs may also be stored (recorded) temporarily or permanently in a removable recording medium, such as a flexible disc, compact disc read-only memory (CD-ROM), magneto-optical (MO) disc, digital versatile disc (DVD), Blu-ray Disc®, magnetic disc, semiconductor memory, or memory card. These removable recording media can be provided as so-called package software.

These programs may be not only installed from a removable recording medium to a personal computer or the like but also downloaded from a download site through a network, such as a local area network (LAN) or the Internet.

These programs also allow a wide variety of apparatuses to serve as the information processing apparatus 1 according to the present embodiment. For example, by downloading these programs to a personal computer, portable information processing apparatus, mobile phone, game machine, video apparatus, or personal digital assistant (PDA), or the like, the portable information processing apparatus or the like can serve as the information processing apparatus 1 according to the present embodiment.

While the present embodiment has been described above, various modifications are conceivable.

While the parameters have been described using the equalizer settings (EQ parameters) of the headphone 3 as an example, other parameters are also conceivable.

For example, if the target apparatus is a headphone, system component, AV receiver, car-mounted audio product, or other audio apparatuses, conceivable examples of the parameters include parameters for setting reverb, parameters for setting echo, flanger effect parameters, phase-shift effect parameters, parameters for setting panpot, parameters for setting a multichannel gain, parameters for setting virtual audio space, setting parameters for bass enhancement or high-range compensation, parameters for noise cancellation filters, and DJ effect parameters.

If the target apparatus is a noise cancelling headphone or the like, the present technology is suitable for sharing parameters for filters which are appropriate to particular situations, such as parameters for a noise cancelling optimization filter for a particular car in a particular railroad route, a noise cancelling optimization filter corresponding to the model of the car, of a car-mounted audio apparatus, or the like.

Of course, the present technology is also suitable for sharing setting (image quality node, etc.) parameters for video signals.

Accordingly, the present technology is applicable to setting of particular functions of various types of audio, video, and entertainment apparatuses and the like.

The present technology may be configured as follows:

(1) An information processing apparatus including: a parameter input unit configured to input parameter information for setting an operating state of a target apparatus; an image conversion unit configured to generate conversion image data by imaging the parameter information; and a setting file image generation unit configured to generate setting file image data where the conversion image data is placed in image data having a larger image size than the conversion image data.

(2) The information processing apparatus according to the above (1), wherein the setting file image data further includes recognition image data obtained by imaging recognition information for recognizing that the setting file image data is an image including the conversion image data.

(3) The information processing apparatus according to the above (1) or (2), wherein the image conversion unit generates the conversion image data by converting the parameter information into one of color information and transparency information.

(4) The information processing apparatus according to the above (3), wherein the image conversion unit generates the conversion image data by converting a value included in the parameter information into one of color information and transparency information.

(5) The information processing apparatus according to the above (3), wherein the image conversion unit generates the conversion image data by converting a value included in the parameter information into one of color information and transparency information in accordance with a conversion pattern.

(6) The information processing apparatus according to above (5), wherein the image conversion unit uses the selected or inputted conversion pattern.

(7) The information processing apparatus according to any one of the above (1) to (6), wherein the setting file image data includes image data corresponding to the conversion image data.

(8) The information processing apparatus according to any one of the above (1) to (7), wherein the setting file image data includes an image indicating that the setting file image data is an image including the conversion image data.

(9) The information processing apparatus according to any one of the above (1) to (8), wherein the setting file image data includes an image indicating a creator of the parameter information.

(10) The information processing apparatus according to any one of the above (1) to (9), wherein the setting file image data includes an image indicating the target apparatus.

(11) The information processing apparatus according to any one of the above (1) to (10), wherein the parameter information is a parameter of an equalizer characteristic.

(12) A method for processing information, including: inputting parameter information for setting an operating state of a target apparatus; generating conversion image data by imaging the parameter information; and generating setting file image data where the conversion image data is placed in image data having a larger image size than the conversion image data.

(13) A program for causing an information processing apparatus to perform: a process of inputting parameter information for setting an operating state of a target apparatus; a process of generating conversion image data by imaging the parameter information; and a process of generating setting file image data where the conversion image data is placed in image data having a larger image size than the conversion image data.

(14) An information processing apparatus including: a setting file image acquisition unit configured to receive setting file image data where conversion image data obtained by imaging parameter information for setting an operating state of a target apparatus is placed in image data having a larger image size than the conversion image data;

and a conversion image extraction unit configured to extract the conversion image data from the setting file image data; and a parameter decoding unit configured to generate parameter information from the conversion image data.

(15) A method for processing information, including: receiving setting file image data where conversion image data obtained by imaging parameter information for setting an operating state of a target apparatus is placed in image data having a larger image size than the conversion image data; and extracting the conversion image data from the setting file image data; and generating parameter information from the conversion image data.

(16) A program for causing an information processing apparatus to perform: a process of receiving setting file image data where conversion image data obtained by imaging parameter information for setting an operating state of a target apparatus is placed in image data having a larger image size than the conversion image data; a process of extracting the conversion image data from the setting file image data; and a process of generating parameter information from the conversion image data.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
one or more processors configured to:
  input parameter information for setting an operating state of a target apparatus, wherein each of the parameter information includes a first value and a second value;
  generate conversion image data by converting the first value included in the parameter information into color information of the conversion image data and the second value included in the parameter information into transparency information of the conversion image data; and
  generate setting file image data where the conversion image data is placed in image data having a larger image size than the conversion image data,
  wherein the setting file image data is generated by placing the conversion image data in a first line of a pixel array of the setting file image data and placing data, obtained by changing the data placed in the first line of the pixel array, in a second or subsequent line of the pixel array of the setting file image data.

2. The information processing apparatus according to claim 1, wherein the setting file image data further includes recognition image data obtained by imaging recognition information for recognizing that the setting file image data is an image including the conversion image data.

3. The information processing apparatus according to claim 1, wherein the one or more processors are configured to generate the conversion image data by converting values included in the parameter information into color information and transparency information in accordance with a conversion pattern.

4. The information processing apparatus according to claim 3, wherein the one or more processors are configured to use the selected or inputted conversion pattern.

5. The information processing apparatus according to claim 1, wherein the setting file image data includes image data corresponding to the conversion image data.

6. The information processing apparatus according to claim 1, wherein the setting file image data includes an image indicating that the setting file image data is an image including the conversion image data.

7. The information processing apparatus according to claim 1, wherein the setting file image data includes an image indicating a creator of the parameter information.

8. The information processing apparatus according to claim 1, wherein the setting file image data includes an image indicating the target apparatus.

9. The information processing apparatus according to claim 1, wherein the parameter information is a parameter of an equalizer characteristic.

10. The information processing apparatus according to claim 1, wherein the parameter information corresponding to a frequency is divided into pieces of n-bit data, wherein a first piece of the n-bit data, that represents the first value, is assigned to the color information and a second piece of the n-bit data, that represents the second value, is assigned to the transparency information.

11. The information processing apparatus according to claim 1, wherein the setting file image data is generated by placing the conversion image data in the first line of the pixel array and placing data, obtained by performing transparency gradation of the data in the first line, in the second line of the pixel array.

12. A method for processing information, comprising:
  inputting parameter information for setting an operating state of a target apparatus, wherein each of the parameter information includes a first value and a second value;
  generating conversion image data by converting the first value included in the parameter information into color information of the conversion image data and the second value included in the parameter information into transparency information of the conversion image data; and
  generating setting file image data where the conversion image data is placed in image data having a larger image size than the conversion image data,
  wherein the setting file image data is generated by placing the conversion image data in a first line of a pixel array of the setting file image data and placing data, obtained by changing the data placed in the first line of the pixel array, in a second or subsequent line of the pixel array of the setting file image data.

13. A non-transitory computer readable medium having stored thereon, a set of computer-executable instructions for causing an information processing apparatus to perform steps comprising:
  inputting parameter information for setting an operating state of a target apparatus, wherein each of the parameter information includes a first value and a second value;
  generating conversion image data by converting the first value included in the parameter information into color information of the conversion image data and the second value included in the parameter information into transparency information of the conversion image data; and
  generating setting file image data where the conversion image data is placed in image data having a larger image size than the conversion image data,
  wherein the setting file image data is generated by placing the conversion image data in a first line of a pixel array of the setting file image data and placing data, obtained by changing the data placed in the first line of the pixel array, in a second or subsequent line of the pixel array of the setting file image data.

14. An information processing apparatus comprising:
one or more processors configured to:
- receive setting file image data where conversion image data, obtained by converting parameter information for setting an operating state of a target apparatus, is placed in image data having a larger image size than the conversion image data,
- wherein each of the parameter information includes a first value and a second value and the conversion image data is generated by converting the first value included in the parameter information into color information of the conversion image data and the second value included in the parameter information into transparency information of the conversion image data;
- extract the conversion image data from the setting file image data; and
- generate parameter information from the conversion image data,
- wherein the setting file image data is generated by placing the conversion image data in a first line of a pixel array of the setting file image data and placing data, obtained by changing the data placed in the first line of the pixel array, in a second or subsequent line of the pixel array of the setting file image data.

15. A method for processing information, comprising:
receiving setting file image data where conversion image data, obtained by converting parameter information for setting an operating state of a target apparatus, is placed in image data having a larger image size than the conversion image data,
wherein each of the parameter information includes a first value and a second value and the conversion image data is generated by converting the first value included in the parameter information into color information of the conversion image data and the second value included in the parameter information into transparency information of the conversion image data;
extracting the conversion image data from the setting file image data; and
generating parameter information from the conversion image data,
wherein the setting file image data is generated by placing the conversion image data in a first line of a pixel array of the setting file image data and placing data, obtained by changing the data placed in the first line of the pixel array, in a second or subsequent line of the pixel array of the setting file image data.

16. A non-transitory computer readable medium having stored thereon, a set of computer-executable instructions for causing an information processing apparatus to perform steps comprising:
receiving setting file image data where conversion image data, obtained by converting parameter information for setting an operating state of a target apparatus, is placed in image data having a larger image size than the conversion image data,
wherein each of the parameter information includes a first value and a second value and the conversion image data is generated by converting the first value included in the parameter information into color information of the conversion image data and the second value included in the parameter information into transparency information of the conversion image data;
extracting the conversion image data from the setting file image data; and
generating parameter information from the conversion image data,
wherein the setting file image data is generated by placing the conversion image data in a first line of a pixel array of the setting file image data and placing data, obtained by changing the data placed in the first line of the pixel array, in a second or subsequent line of the pixel array of the setting file image data.

* * * * *